United States Patent
Douglis et al.

(10) Patent No.: US 11,093,397 B1
(45) Date of Patent: Aug. 17, 2021

(54) CONTAINER-BASED FLASH CACHE WITH A SURVIVAL QUEUE

(71) Applicant: EMC IP Holding Company LLC, Hopkinton, MA (US)

(72) Inventors: Frederick Douglis, Basking Ridge, NJ (US); Cheng Li, Palo Alto, CA (US); Philip Shilane, Newtown, PA (US); Grant Wallace, Pennington, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 146 days.

(21) Appl. No.: 14/966,613

(22) Filed: Dec. 11, 2015

Related U.S. Application Data

(60) Provisional application No. 62/163,742, filed on May 19, 2015.

(51) Int. Cl.
  *G06F 12/12* (2016.01)
  *G06F 12/0831* (2016.01)
  *G06F 12/128* (2016.01)
  *G06F 12/02* (2006.01)

(52) U.S. Cl.
  CPC ...... *G06F 12/0833* (2013.01); *G06F 12/0246* (2013.01); *G06F 12/128* (2013.01); *G06F 2212/62* (2013.01); *G06F 2212/69* (2013.01); *G06F 2212/7201* (2013.01); *G06F 2212/7209* (2013.01)

(58) Field of Classification Search
  CPC ............. G06F 12/0833; G06F 12/0246; G06F 12/128; G06F 2212/62; G06F 2212/69; G06F 2212/7201; G06F 2212/7209
  See application file for complete search history.

(56) References Cited

U.S. PATENT DOCUMENTS

| | | | |
|---|---|---|---|
| 8,046,538 B1 * | 10/2011 | Stenstrom | G06F 12/0804 711/117 |
| 8,117,396 B1 | 2/2012 | Fair | |
| 8,566,506 B2 | 10/2013 | Locasio | |
| 2003/0088739 A1 | 5/2003 | Wilkes | |
| 2003/0105926 A1 | 6/2003 | Rodriguez | |
| 2005/0055506 A1 * | 3/2005 | DeMent | G06F 12/125 711/133 |

(Continued)

OTHER PUBLICATIONS

Jaleel et al., High Performance Cache Replacement Using Re-Reference Interval Prediction (RRIP), ISCA, Jun. 19, 2010.

(Continued)

*Primary Examiner* — Adam M Queler
*Assistant Examiner* — Eric T Loonan
(74) *Attorney, Agent, or Firm* — Krishnendu Gupta; Nikhil Patel

(57) ABSTRACT

Use of a survival queue to manage a container-based flash cache is disclosed. In various embodiments, a corresponding survival time is associated with each of a plurality of containers stored in a flash cache, each container comprising a plurality of data blocks. The survival time may be determined based at least in part on a calculated proportion of relatively recently accessed data blocks associated with the container is associated with the container. A container to evict from the flash cache is selected based at least in part on a determination that the corresponding survival time of the selected container has expired.

22 Claims, 13 Drawing Sheets

(56) References Cited

U.S. PATENT DOCUMENTS

| | | |
|---|---|---|
| 2006/0143256 A1 | 6/2006 | Galchev |
| 2009/0077395 A1 | 3/2009 | Tsai |
| 2011/0191522 A1* | 8/2011 | Condict ............... G06F 12/123 711/103 |
| 2012/0210041 A1 | 8/2012 | Flynn |
| 2012/0297122 A1 | 11/2012 | Gorobets |
| 2013/0117497 A1 | 5/2013 | Cui |
| 2014/0089559 A1* | 3/2014 | Cai ...................... G06F 12/126 711/102 |
| 2014/0095907 A1 | 4/2014 | Nguyen Tien |
| 2014/0129779 A1* | 5/2014 | Frachtenberg ........ G06F 12/122 711/136 |
| 2014/0244899 A1 | 8/2014 | Schmier |

OTHER PUBLICATIONS

Jiang et al., LIRS: An Efficient Low Inter-reference Recency Set Replacement Policy to Improve Buffer Cache Performance, Jun. 15, 2002.

Karedla et al., Caching Strategies to Improve Disk System Performance, Mar. 1994.

Kim et al., BPLRU: A Buffer Management Scheme for Improving Random Writes in Flash Storage, FAST, Feb. 26-29, 2008.

Li et al., Nitro: A Capacity-Optimized SSD Cache for Primary Storage, USENIX ATC '14, Jun. 19, 2014.

Li et al., Pannier: A Container-based Flash Cache for Compound Objects, Dec. 7, 2015.

Megiddo et al., ARC: A Self-Tuning, Low Overhead Replacement Cache, FAST, Mar. 31, 2003.

Robinson et al., Data Cache Management Using Frequency-Based Replacement, Apr. 1, 1990.

Saxena et al., FlashTier: a Lightweight, Consistent and Durable Storage Cache, Apr. 10-13, 2012.

Smaragdakis et al., EELRU: Simple and Effective Adaptive Page Replacement, SIG-METRICS, May 1-4, 1999.

Sonneborn et al., The Bang-Bang Principle for Linear Control Systems, SIAM J. Control, 1965.

Tang et al., RIPQ: Advanced Photo Caching on Flash for Facebook, FAST '15, Feb. 16, 2015.

U.S. Appl. No. 14/038,673, "Insertion and Eviction Schemes for Deduplicated Cache System of a Storage System", filed Sep. 26, 2013.

U.S. Appl. No. 14/038,687, "File Indexing Using an Exclusion List of a Deduplicated Cache System of a Storage System", filed Sep. 26, 2013.

U.S. Appl. No. 14/038,694, "Indexing a Deduplicated Cache System by Integrating Fingerprints of Underlying Deduplicated Storage System", filed Sep. 26, 2013.

U.S. Appl. No. 14/038,699, "Method for Packing and Storing Cached Data in Deduplicated Cache System of a Storage System", filed Sep. 26, 2013.

U.S. Appl. No. 14/302,552, "Method to Extend SSD Lifespan in Caching Applications by Aggregating Related Content Into Large Cache Units", filed Jun. 12, 2014.

U.S. Appl. No. 14/038,668, "Indexing Architecture for Deduplicated Cache System of a Storage System", filed Sep. 26, 2013.

U.S. Appl. No. 14/609,839, "Methods to Efficiently Implement Coarse Granularity Cache Eviction Based on Segment Deletion Hints", filed Jan. 30, 2015.

U.S. Appl. No. 14/609,889, "Methods to Efficiently Implement Coarse Granularity Cache Eviction", filed Jan. 30, 2015.

U.S. Appl. No. 14/609,902, "Methods to Select Segments of an Evicted Cache Unit for Reinsertion Into the Cache", filed Jan. 30, 2015.

Zhou et al., The Multi-Queue Replacement Algorithm for Second Level Buffer Caches, Proceedings of the 2001 USENIX Annual Technical Conference, Jun. 25, 2001.

\* cited by examiner

CONTAINER-BASED FLASH CACHE WITH A SURVIVAL QUEUE

CROSS REFERENCE TO OTHER APPLICATIONS

This application claims priority to U.S. Provisional Patent Application No. 62/163,742 entitled CONTAINER-BASED FLASH CACHE FOR COMPOUND OBJECTS filed May 19, 2015 which is incorporated herein by reference for all purposes.

BACKGROUND OF THE INVENTION

Flash memory is a technology with performance closer to DRAM than hard disk drives (HDD), but with the property that large contiguous regions of flash must be explicitly erased before being overwritten. As a result, data residing in a region that is selected to be erased must be copied elsewhere prior to erasure if it is to continue to be accessible. Garbage collection is the process of coalescing useful data to create large regions that may be erased. Because flash can withstand only a limited number of erasure cycles to a given region, as well as the performance cost of copying existing data, it is desirable to minimize the impact of garbage collection.

Flash caches may be layered in front of hard disk drive (HDD) storage to achieve high system performance. However, the hardware characteristics of flash may be at odds with the assumptions of standard cache eviction algorithms. For example, existing caching algorithms typically make caching decisions at per-block granularity, which does not align to the erasure units of flash.

To optimize write throughput and reduce flash erasures, small blocks are often buffered together to form a container matching the flash erasure unit. A new issue arises for a container-based cache, since blocks within a container may be "alive" or "dead," and live blocks may need to be copied forward during garbage collection to make them accessible after an erasure. In one container, blocks may have highly varying access patterns and may exist in one of three states: hot (recently accessed greater than a threshold amount), cold (not recently accessed), or invalid (e.g., associated data deleted or overwritten). Existing cache eviction algorithms are not optimized for containers that have blocks in such a divergent mix of states.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A container-based flash cache with a survival queue is disclosed. In various embodiments, data comprising a plurality of blocks may be collected into and stored in a flash cache as containers, each containing a plurality of blocks of data. Hot and cold queues may be used to manage containers stored in the flash cache. Promotion and eviction algorithms disclosed herein may be used to achieve an appropriate balance between maximizing availability from the cache of frequently and/or recently accessed blocks and the impact of erasures (e.g., due to data block insertions and reinsertions) on flash device lifetime. In various embodiments, a "survival queue" may be used to ensure that a container that includes only a relatively few recently accessed blocks ("hot" blocks) is not kept in the flash cache due to the access activity of a few blocks.

Figure 1:
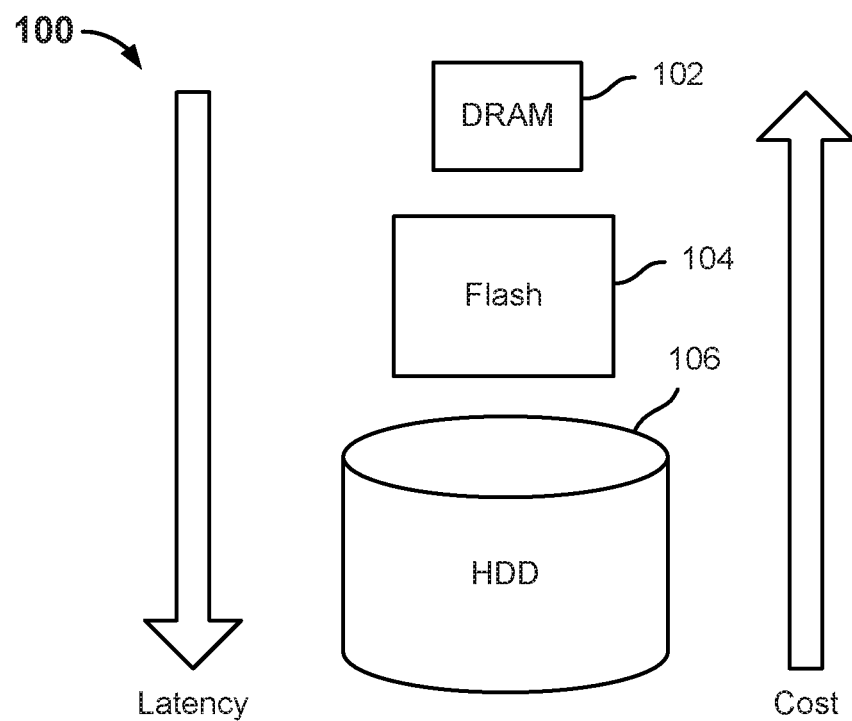
FIG. 1 is a block diagram illustrating an embodiment of a multi-tier storage system.

FIG. 1 is a block diagram illustrating an embodiment of a multi-tier storage system. In the example shown, tiered storage system 100 includes dynamic random access memory (DRAM) 102, flash storage 104, and hard disk drive(s) (HDD) 106. As indicated by the arrow on the left side of the drawing, latency (typically) increases as data is migrated from DRAM 102 (lowest latency/fastest access) to flash storage 104 (longer latency than memory, but lower than hard disk) to HDD 106. Conversely, as indicated by the arrow on the right side of the drawing, cost of storage per unit of data (typically) decreases as data is migrated from DRAM 102 (most expensive) to flash storage 104 (less expensive than memory, but more expensive than hard disk) to HDD 106.

In various embodiments, data objects, such as files, are stored as "blocks" of data which are organized ("packed") into logical "containers" of blocks. In some embodiments, file objects may be broken into segments and each block may correspond to a segment. A segment index may be used to ensure that each unique segment is stored only once, a technique sometimes referred to as de-duplication or de-duplicated storage. When a file is accessed, e.g., by an application, the component segments are retrieved and used to reassemble the file and make the file available to the requesting application.

Containers in which recently stored and/or accessed blocks are stored may be stored in an in-memory cache in DRAM 102. For example, blocks that have just been stored for the first time by an application, or which have recently been modified, may reside at least for a time in an in-memory cache. Such containers may be migrated, e.g., based on access frequency and/or recency, the need to store other containers in memory, etc., from the in-memory cache in DRAM 102 to a flash cache stored in flash storage 104, and eventually evicted from the flash cache and stored only in HDD 106. In various embodiments, blocks and/or containers may be maintained in a flash cache stored in flash storage 104 as determined at least in part by techniques disclosed herein.

Figure 2:
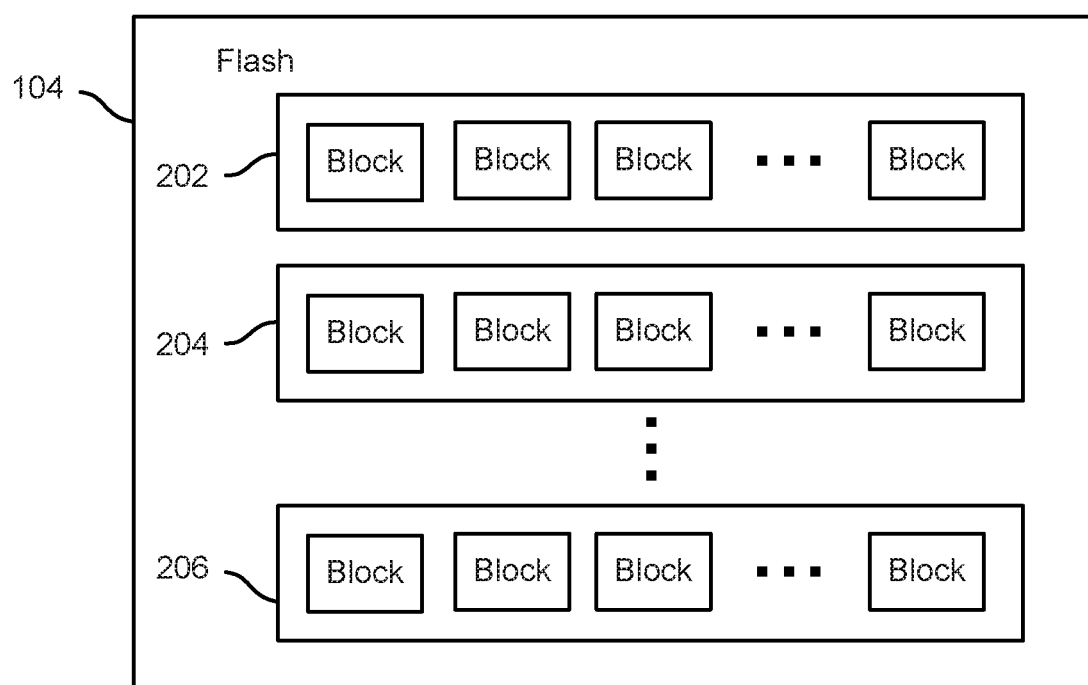
FIG. 2 is a block diagram illustrating an example of a flash-based cache in an embodiment of a multi-tier storage system.

FIG. 2 is a block diagram illustrating an example of a flash-based cache in an embodiment of a multi-tier storage system. In the example shown, a flash cache, comprising a plurality of containers, represented in FIG. 2 by containers 202, 204, and 206, is stored in flash storage 104. In various embodiments, techniques disclosed herein are used to determine which containers, such as containers 202, 204, and 206 in the example shown, are stored in the flash cache at a given time, and in some embodiments for each container which blocks are included in that container.

In various embodiments, a modified "segmented least recently used" (SLRU) cache architecture and logic are used to manage a flash cache, such as the one shown in FIG. 2. In various embodiments, flash cache management data structures are provided and used to track "hot" and "cold" containers, each containing a plurality of blocks, including potentially blocks each of which may be "hot" (e.g., recently stored or accessed), "cold" (e.g., still valid but not recently used), or "invalid" (e.g., superseded by a modification or no longer needed due to a file having been deleted). In various embodiments, techniques disclosed herein are used to group hot blocks together in containers and cold blocks together in containers such that blocks within a container will tend to age at the same rate and can be evicted as a group. In this way, an entire container can be evicted without the need to repeatedly copy blocks to new containers when freeing invalid blocks in the container.

Figure 3:
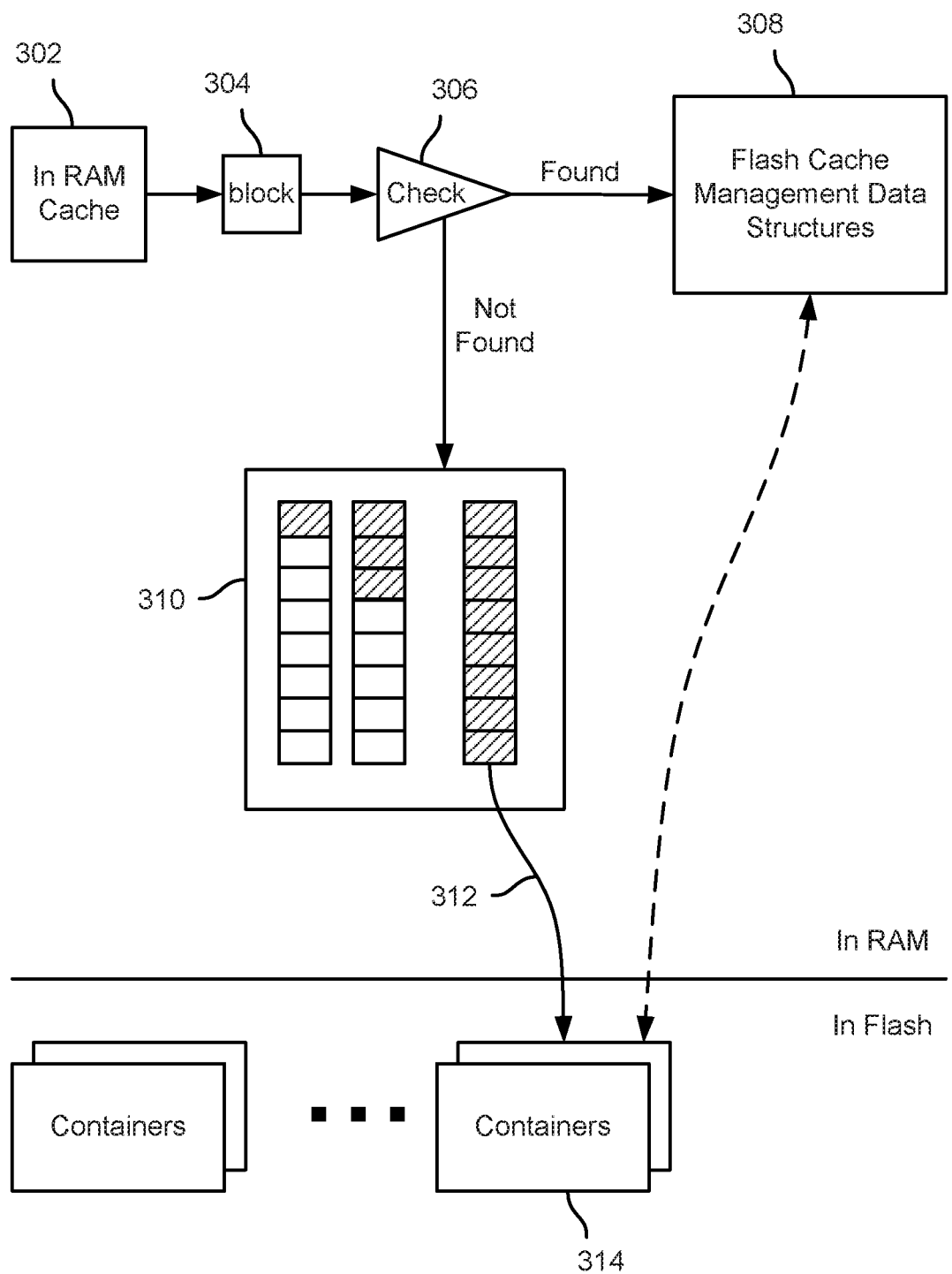
FIG. 3 is a block diagram illustrating an example of a container-based flash caching architecture in an embodiment of a tiered storage system.

FIG. 3 is a block diagram illustrating an example of a container-based flash caching architecture in an embodiment of a tiered storage system. In the example shown, eviction policies are applied with respect to blocks stored in an in-memory (e.g., RAM) cache 302 to determine which blocks will be maintained in the in-memory cache 302. In the example shown, a block 304 may be determined to be evicted from in-memory cache 302. A check 306 is performed to determine whether the block 304 is present already in an associated flash cache. If the block 304 is found in the flash cache, flash cache management data structures 308 may be updated, for example to reflect updated statistics indicating how frequently and/or recently the block 304 has been accessed. If the block 304 is not found to already be present in the flash cache, e.g., it is a newly-stored or modified block, the block 304 is packed into an available container stored in a container packing/staging area 310, e.g., in memory. In the example shown, when a container in container packing/staging area 310 becomes full, the container is migrated 312 and added to a set of containers 314 comprising a flash-based cache. Corresponding and/or affected flash cache management data structures included in flash cache management data structures 308 may be updated to reflect addition of the container to containers 314.

Figure 4:
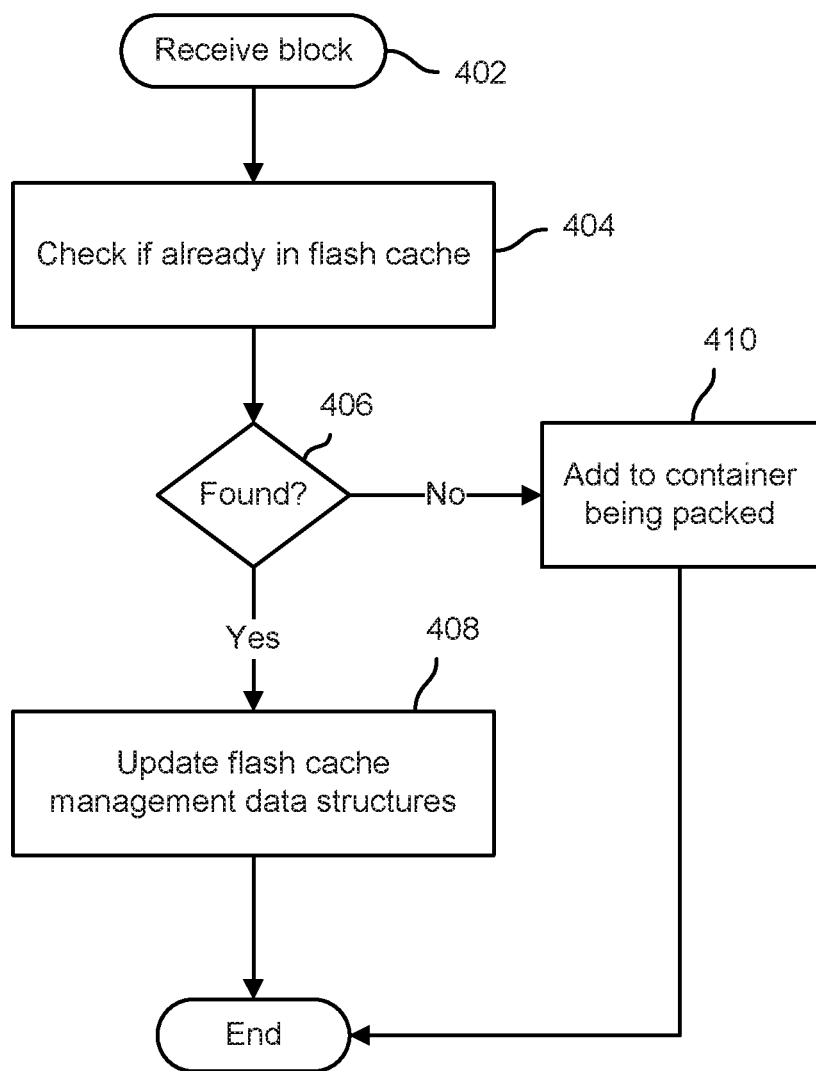
FIG. 4 is a flow chart illustrating an embodiment of a process to update a flash cache to reflect eviction of a block from an in-memory cache.

FIG. 4 is a flow chart illustrating an embodiment of a process to update a flash cache to reflect eviction of a block from an in-memory cache. In the example shown, when a block is evicted from the in-memory cache (402) a check is performed to determine whether the block is already stored in the flash cache (404). For example, a container in which the block was stored (e.g., in a hard disk drive) may have been stored in the flash cache, e.g., in connection with a request by an application to read a file (or portion thereof) with which the block is associated. If the block is found in the flash cache (406), flash cache management data structures are updated (408), as described more fully below. If the block is not found in the flash cache (406), the block is added to a container that is being packed (410).

Figure 5:
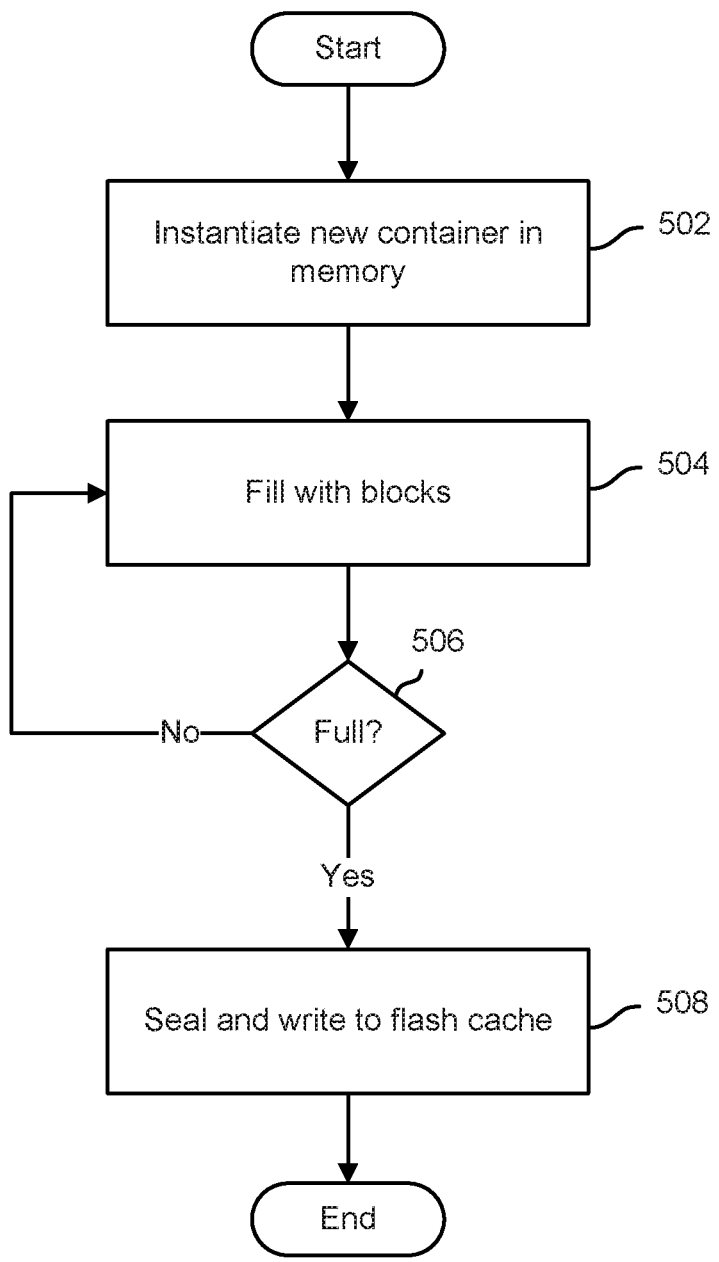
FIG. 5 is a flow chart illustrating an embodiment of a process to pack and store containers.

FIG. 5 is a flow chart illustrating an embodiment of a process to pack and store containers. In various embodiments, the process of FIG. 5 may be used to pack containers, e.g., in a container packing/staging area in memory, such as area 310 of FIG. 3, and to add containers (e.g., once full) to a flash cache, as in operation 312 of FIG. 3. In the example shown, a new container is instantiated in memory (502). For example, one or more blocks may be evicted from the in-memory cache and there may not be sufficient and/or suitable spaces available in containers that have already been instantiated and/or partially packed. The container is filled with blocks (504) until it is full (506). Once full (506), the container is sealed and written to the flash cache (508).

Figure 6:
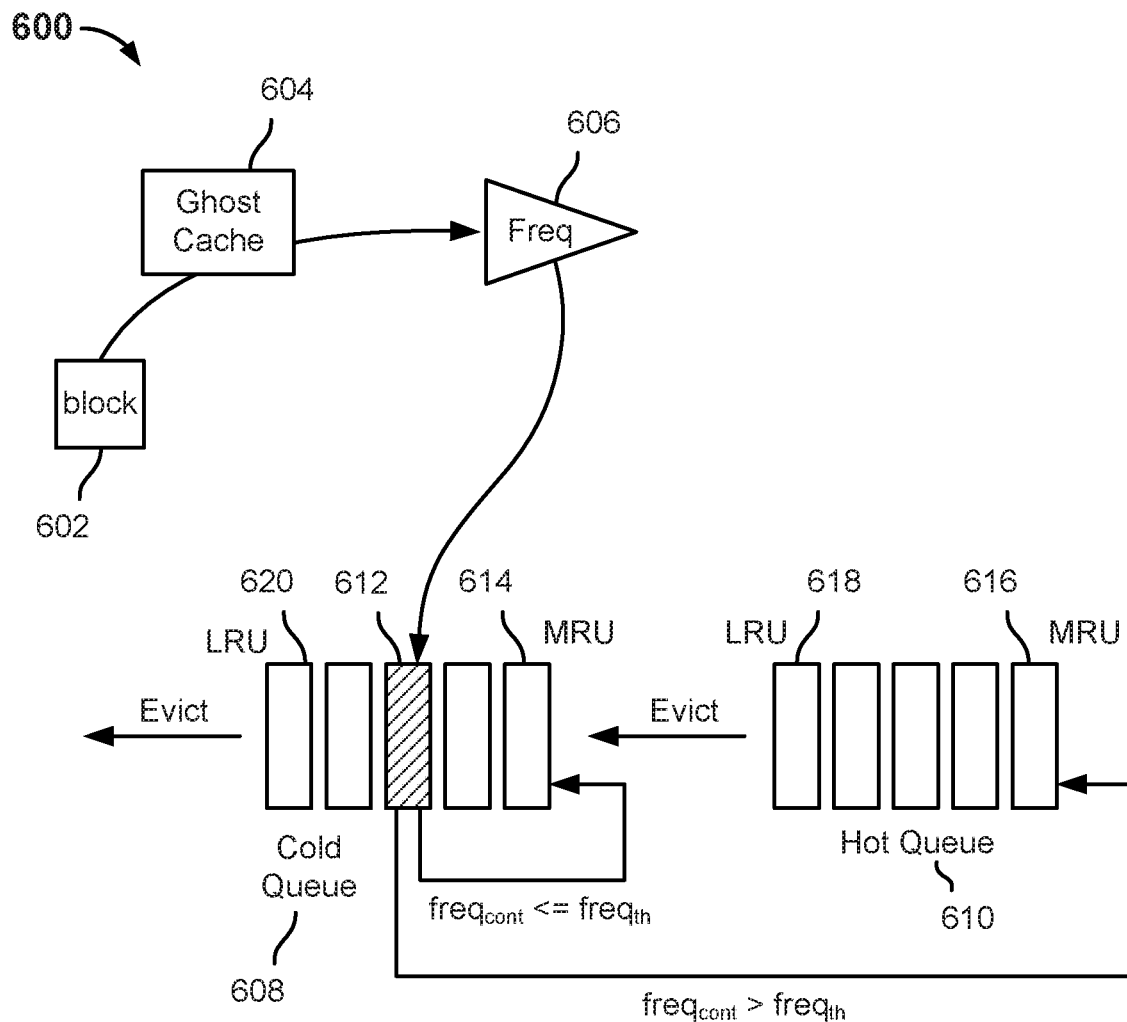
FIG. 6 is a block diagram illustrating an example of flash cache management data structures in an embodiment of a tiered storage system.

FIG. 6 is a block diagram illustrating an example of flash cache management data structures in an embodiment of a tiered storage system. In the example 600 shown, access statistics for a block 602, such as a block evicted from an in memory cache, are read from a "ghost cache" 604 or other data structure and/or repository. In some embodiments, ghost cache 604 includes an 8-bit or other access counter for blocks that are currently stored in or have been evicted recently from a flash cache or other cache that the ghost cache 604 is being used to manage. In some embodiments the ghost cache stores only metadata, e.g., for each block there is a key that identifies the block uniquely and includes a corresponding access count. In the example shown, a frequency 606 of access (e.g., access count) determined from the ghost cache 604 for the block 602 is used to update corresponding information stored in flash cache management data structures, which include a cold queue 608 and hot queue 610 in this example. An advantage of using a ghost cache is that it can track block access counts and other patterns for a larger number of blocks than will fit in the cache itself, since the cache stores data blocks, while the ghost cache stores compact metadata describing the blocks.

In various embodiments, cold queue 608 and hot queue 610 are used to represent and manage containers stored in a flash cache, such as the flash cache shown in FIG. 2 as being stored in flash storage 104 of FIG. 1, and the containers 314 in the example shown in FIG. 3. Each container in the flash cache may be represented in either cold queue 608 or hot queue 610, based for example on the respective frequency (or other access) counts of the blocks comprising the container. Containers may be promoted or demoted to new positions with a queue, evicted from the hot queue 610 to cold queue 608, or evicted from the cold queue 608 and from the flash cache itself, as disclosed herein, based on the respective frequency (or other access) counts of the blocks comprising the respective containers. The purpose of using both a cold queue and hot queue is that a block may be accessed a large number of times, though with a large time gap between accesses. Such blocks could be evicted from a single queue system, but because they are accessed sufficiently to be promoted to a hot queue, they will remain in the cache longer than shorter-lived blocks that are accessed below the hot queue access threshold. In this manner, the cold queue tends to hold blocks accessed a few times within a short time window, while the hot queue tends to access blocks accessed more frequently, though over a longer time window. While we may use the terms "hot queue" and "cold queue", it should be understood that more than two queues may be used, with each "hotter" queue requiring progressively greater access counts for a container insertion than a "colder" queue.

In the example shown in FIG. 6, block 602 has been determined to be associated with a container represented in cold queue 608 by metadata stored in a position 612 within cold queue 608. For example, metadata stored in (associated with) position 612 in cold queue 608 may include a pointer to a container information stored in a set of "cache information" maintained with respect to containers in the flash cache. In the example shown, a container frequency metric or other value for the container with which block 602 has been determined to be associated may be updated, for example to reflect the frequency information 606 determined for the block 602. In the example shown, if the (updated) container frequency is determined to be less than or equal to a prescribed container frequency threshold, the container may be moved up to a "most recently used" (MRU) position 614 in cold queue 608. If the (updated) container frequency is determined instead to be greater than the prescribed container frequency threshold, the container may be moved up to a "most recently used" (MRU) position 616 in hot queue 610.

In some embodiments, a container represented in hot queue 610 in a position other than MRU position 616 may be promoted to the MRU position 616 of hot queue 610, for example if one or more blocks in the container have been accessed recently.

In various embodiments, computing an aggregate frequency for each container, and only promoting a container to the hot queue 610 if the container frequency exceeds a prescribed threshold, avoids having a container be moved all the way to the MRU position 616 of hot queue 610 as a result of periodic but relatively few accesses to blocks in the container. Access frequency below the threshold may maintain such a container in the flash cache, e.g., by periodically moving the container to the MRU position 614 of cold queue 608, without (necessarily) having the container jump to a position ahead of (possibly) relatively more active ("hot") containers represented in hot queue 610.

Over time, as containers associated with more recently accessed blocks are added (inserted) to the flash cache, less recently and/or frequently accessed containers may move to lower positions in the hot queue 610 or cold queue 608, respectively. For example, a container represented in hot queue 610 that becomes less active may be displaced to successively lower positions within hot queue 610, e.g., as metadata representing other containers are promoted to the MRU position 616 of hot queue 610. A container that is demoted to the least recently used (LRU) position 618 may be evicted from the hot queue 610 and moved down (initially) to the MRU position 614 of cold queue 608. Similarly, a container represented in cold queue 608 that becomes less active may be displaced to successively lower positions within cold queue 608, e.g., as metadata representing other containers are promoted to (or evicted from hot queue 610 to) the MRU position 614 of cold queue 608. A container that is demoted to the least recently used (LRU) position 620 of cold queue 608 may be evicted from cold queue 608 and the container and blocks comprising the container correspondingly evicted from the flash cache.

When there are more than two queues, it should be understood that as a container is evicted from the LRU position of a hotter queue, it is inserted into the MRU position of the next colder queue. When a container is evicted from the LRU position of the coldest queue, the container is freed from the cache. In an alternative implementation, a subset of blocks in the container may be copied into a new container and reinserted into the cache.

In an alternative implementation, when a new container is formed, it may be initially inserted into the MRU position of the queue such that the container's access count meets the access count threshold for the queue. As an example, if the hottest queue has an access count threshold of 10, and a new container is formed that has an access count of 11, then the container is inserted into the MRU position of the hottest queue. Access counts for blocks and containers may start at a value greater than zero due to access counts maintained by a ghost cache.

In the example shown in FIG. 6 and described above, a "hot" queue and a "cold" queue are provided and used. In various embodiments, three or more queues may be used. For example, a "most hot", "less hot", and "least hot" queue may be used. In various embodiments, any terminology may be used to refer to two or more queues provided and used to track containers based on relative access counts. For example, "most hot", "less hot", and "least hot" may be used, or "cold", "colder", and "coldest", or simply "first", "second", "third", etc. In some embodiments, a number of queues to be used may be determined based at least in part on a target, measured, and or computed flash usage metric. For example, a "flash usage effectiveness" or "FUE" value may be computed by dividing the number of bytes read from flash by the number of bytes written to flash. In some embodiments, access count and related thresholds, such as the container frequency threshold described above in connection with FIG. 6, may be determined at least in part based on a computed FUE or other metric. In some embodiments, different numbers and configurations (e.g., sizes) of queues may be used, each during a corresponding test period. For each test period, a bytes read from flash and bytes written to flash may be tracked and for each an FUE or equivalent metric may be computed, and the respective computed values used to determine an optimal number of queues (and/or configuration of queues) to be used.

Figure 7:
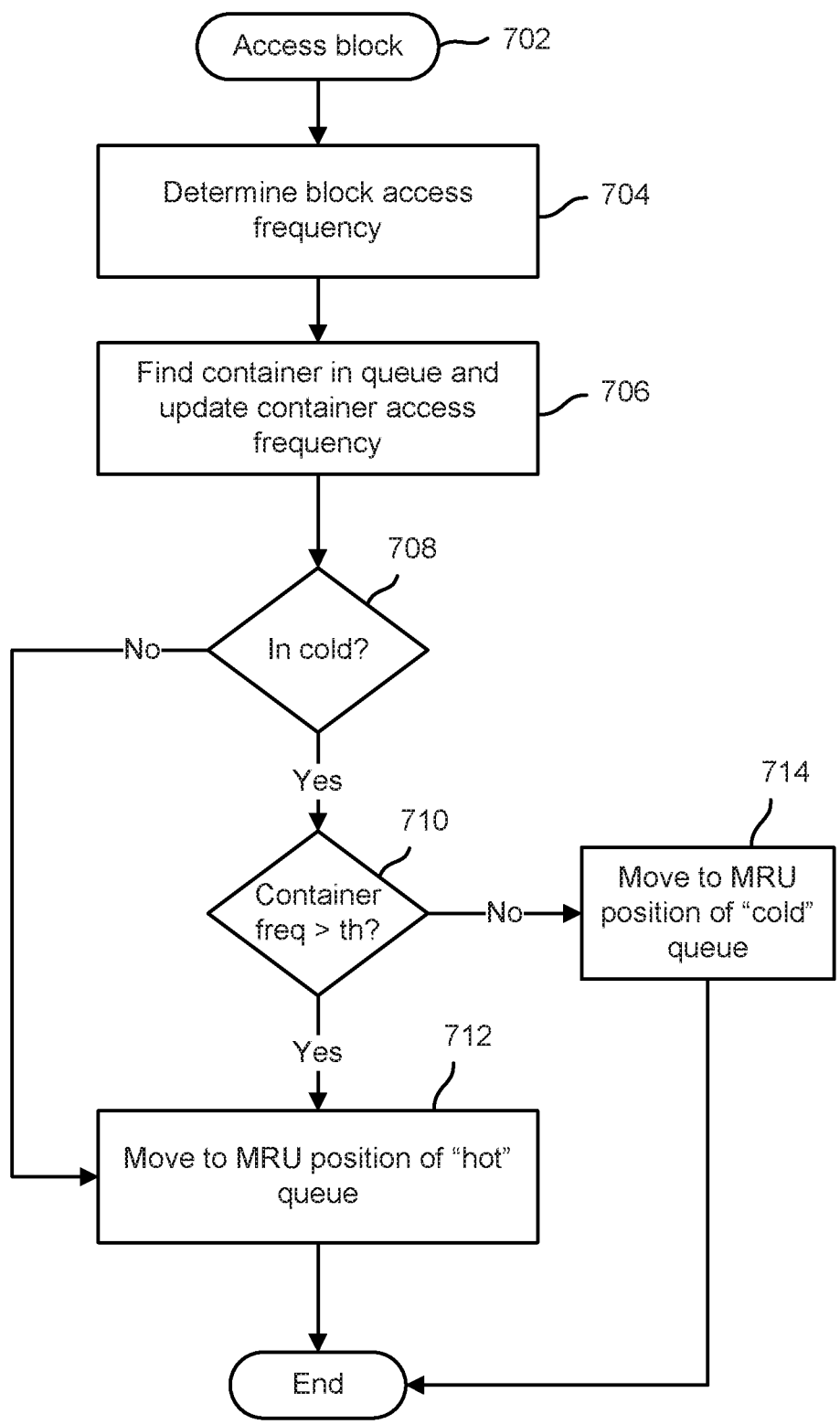
FIG. 7 is a flow chart illustrating an embodiment of a process to update data structures used to manage a flash cache.

FIG. 7 is a flow chart illustrating an embodiment of a process to update data structures used to manage a flash cache. In the example shown, when a block is accessed (702), or upon occurrence of another update triggering event, a block access frequency is determined (704). For example, an access count stored in a ghost cache, such as ghost cache 604 of FIG. 6, may be read. A container with which the block is associated is determined, and the block access frequency is used to update a container access frequency of the container with which the block has been determined to be associated (706). If the container is represented in the cold queue (708) and the updated container frequency is greater than a prescribed threshold (710), the container is moved to a most recently used (MRU) position of the "hot" queue (712). If the container is represented (initially) in the cold queue (708) and the updated container frequency is less than or equal to the prescribed threshold (710), the container is moved to a most recently used (MRU) position of the cold queue (714). If the container is already in the hot queue (708), the container is moved to the MRU of the hot queue (712).

Figure 8:
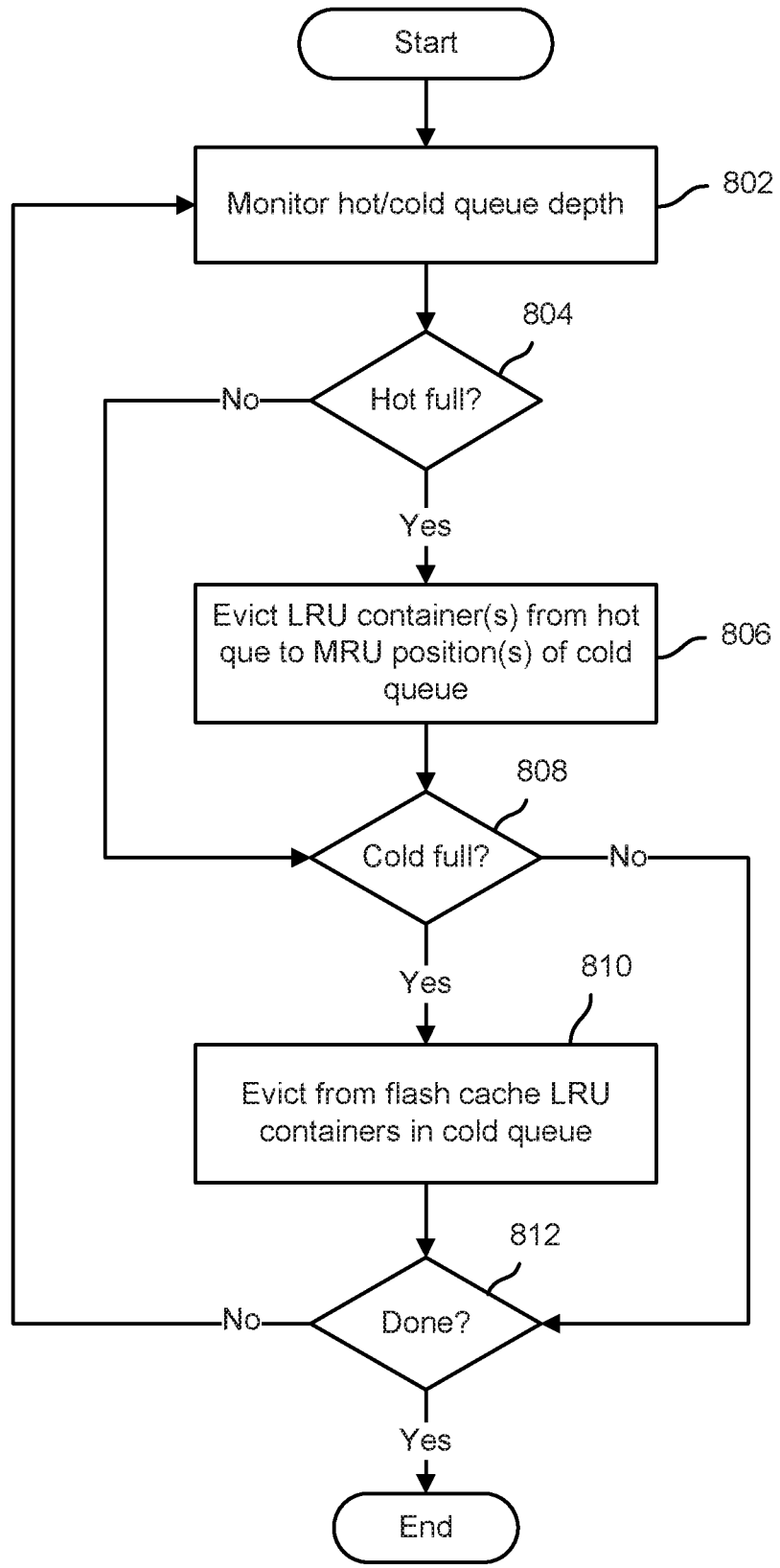
FIG. 8 is a flow chart illustrating an embodiment of a process to manage a flash cache.

FIG. 8 is a flow chart illustrating an embodiment of a process to manage a flash cache. In the example shown, the respective queue depths of hot and cold queues provided and used to manage a flash cache, such as cold queue 608 and hot queue 610 of FIG. 6, are monitored (802). If the hot queue becomes full and room is needed for a more recently accessed container (804), one or more containers are evicted from the least recently used (LRU) end of the hot queue and moved to the MRU position(s) of the cold queue (806). If the cold queue becomes full and room must be made for other/different containers (808), e.g., for containers evicted from the hot queue, then one or more containers may be evicted from the least recently used (LRU) end of the cold queue (810), resulting in those containers and blocks comprising same being removed from the flash cache. The process of FIG. 8 continues until done, e.g., the tiered storage system in which the flash cache is used is taken offline (812).

Figure 9A:
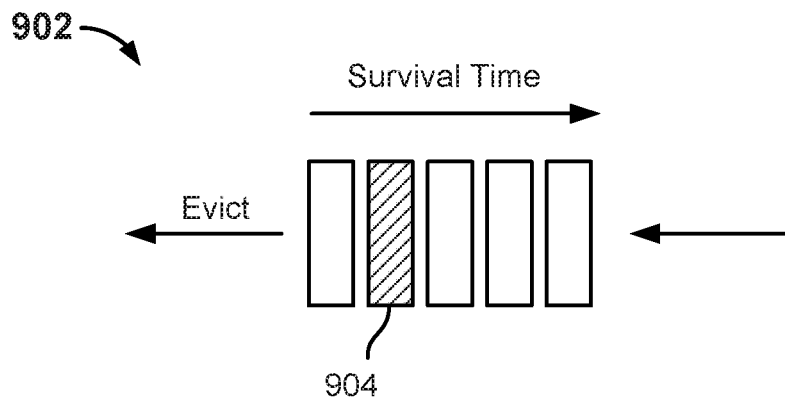
FIG. 9A is a block diagram illustrating an example of a data structure to manage a flash cache in an embodiment of a tiered storage system.

FIG. 9A is a block diagram illustrating an example of a data structure to manage a flash cache in an embodiment of a tiered storage system. In the example shown, a "survival queue" 902 is provided to track containers stored in flash cache. While the cold and hot queue system is effective at removing containers that have not been accessed recently, a container may remain in such queues due to a single block being periodically accessed, even if the rest of the container's blocks are invalid or never reassessed. A survival queue is designed to access containers after a period of time has passed and determine whether to keep the container, evict it in its entirety, or copy selected blocks to a new container and free the current container. In various embodiments, containers in flash cache may be represented in survival queue 902 in an order determined based at least in part on a "survival time" computed for each respective container. For example, for each container in the flash cache a "survival time" corresponding to a latest time the container will be allowed to remain in the cache, barring occurrence of an event that cause the survival time for the container to be extended, is computed. Each container is represented in survival queue 902 in a location that corresponds to its survival time relative to other containers in the flash cache. For example, in the example shown in FIG. 9A, a container corresponding to location 904 in survival queue 902 has a survival time that is relatively shorter (sooner to expire, or already expired, etc.) than containers associated with positions to the right of location 904, as shown.

In various embodiments, if blocks comprising a container in the flash cache are accessed, but in a pattern that does not result in the survival time for the container being extended before the survival time is determined to have expired, the block accesses may not be sufficient to prevent the container from being evicted from the flash cache. For example, in some embodiments, if blocks comprising a container are accessed but with a frequency that is lower than a prescribed threshold, and/or if accesses are associated with fewer than a threshold number of different blocks in the container, the survival time for the container may expire and/or become lower than the survival time of other containers in the cache, (potentially) making the container subject to eviction from the flash cache despite the recent access activity.

Figure 9B:
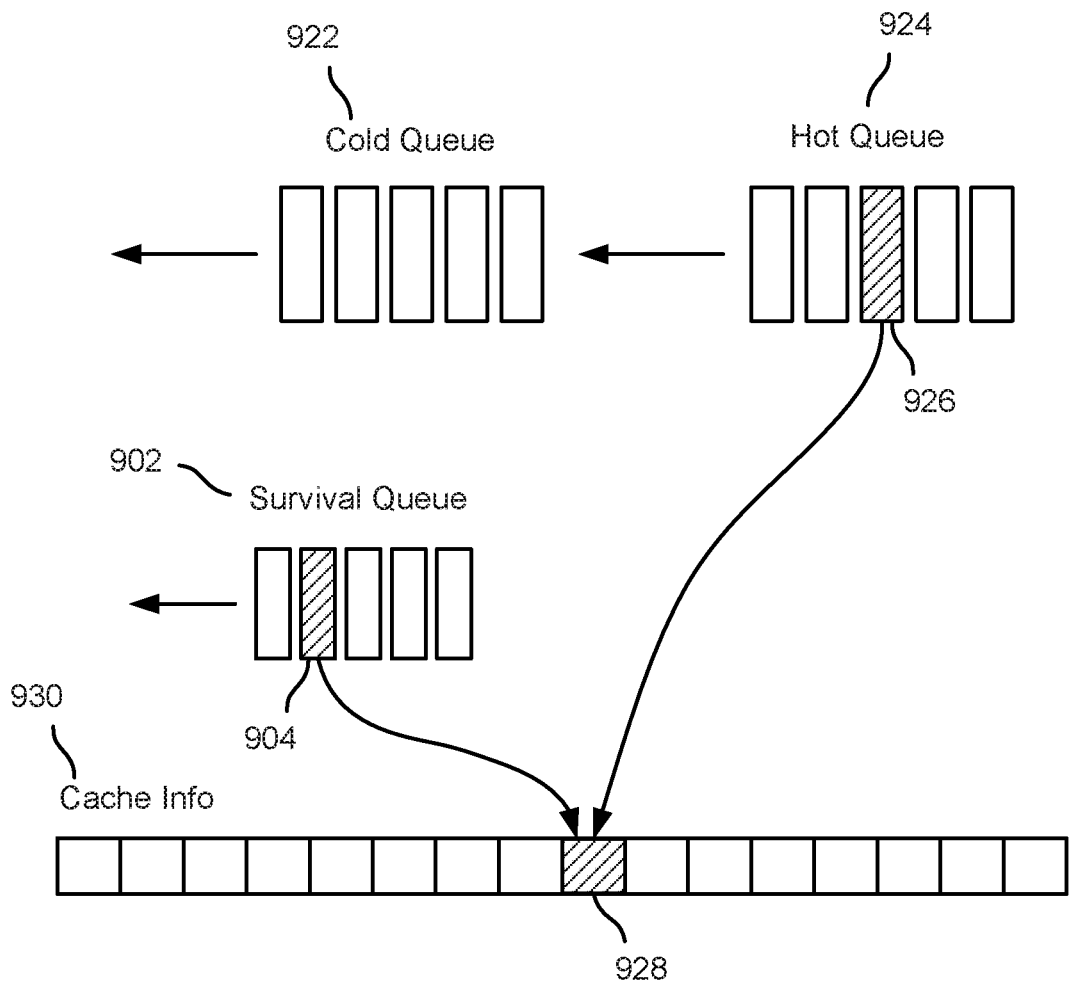
FIG. 9B is a block diagram illustrating examples of data structures to manage a flash cache in an embodiment of a tiered storage system.

FIG. 9B is a block diagram illustrating examples of data structures to manage a flash cache in an embodiment of a tiered storage system. In the example shown, survival queue 902 of FIG. 9A is used together with a container-based cold queue 922 and a container-based hot queue 924 to manage a container-based flash cache. Containers are represented in the respective queues 902, 922, and 924, as applicable, by metadata, such as pointers, that point to cache information as stored in a cache information array 930.

In the example shown in FIG. 9B, a container represented by data associated with location 904 of survival queue 902 may also be represented in hot queue 924 at location 926. For example, a container frequency of the container may have been updated to a level greater than the container frequency threshold required to be promoted to and/or within hot queue 924, but as a result of frequent accesses to a relatively small number of blocks in the container. The survival time of the same container, as stored in location 928 of cache information array 928, for example, may have passed or be approaching expiration as a result, resulting in the container being associated with a position 904 in survival queue 902 that is nearing the least recently used end of survival queue 902, making the container potentially subject to eviction from the flash cache, despite the fact that it contains blocks that have been accessed recently.

Figure 10:
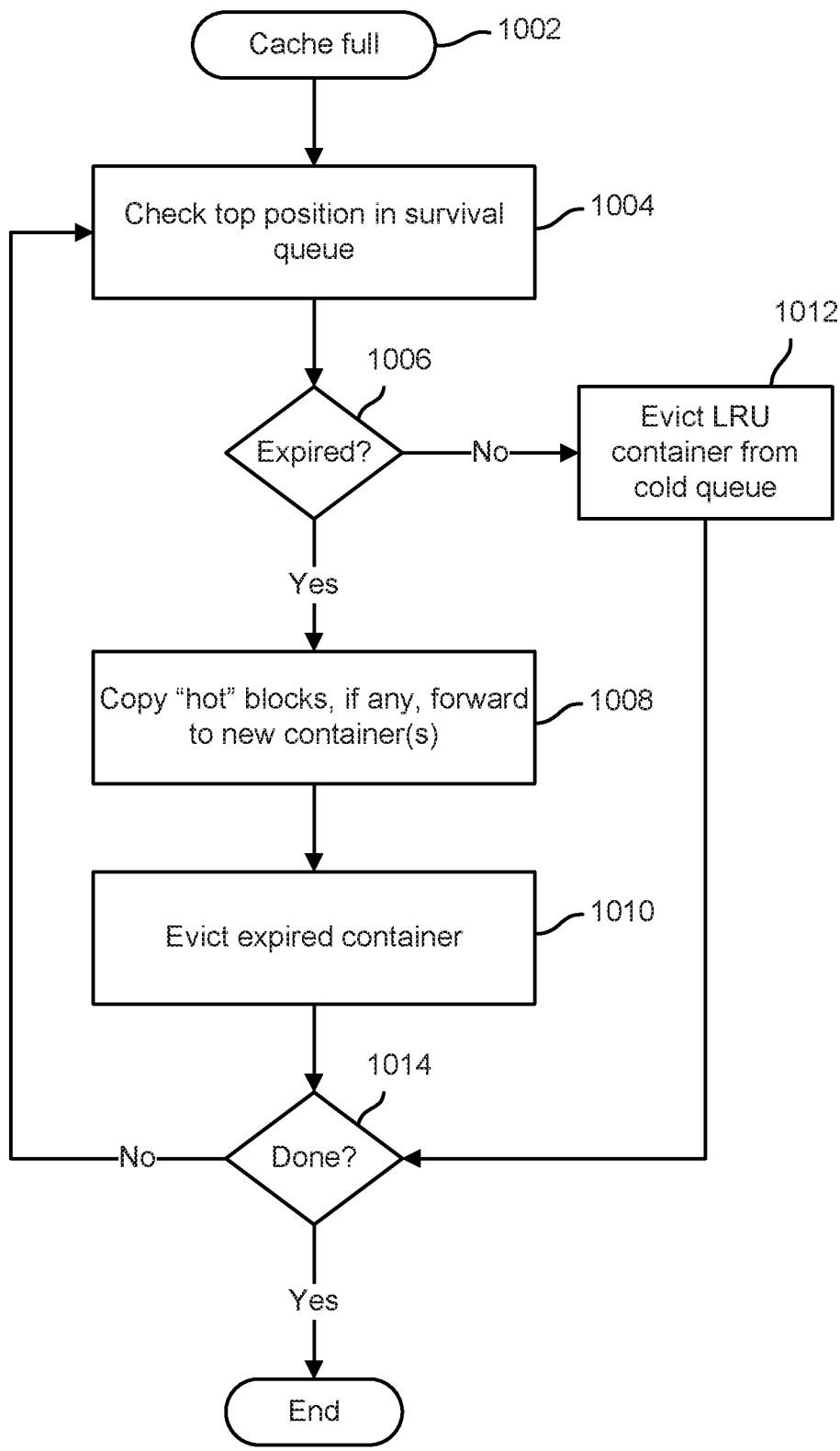
FIG. 10 is a flow chart illustrating an embodiment of a process to maintain a flash cache.

FIG. 10 is a flow chart illustrating an embodiment of a process to maintain a flash cache. In the example shown, when the flash cache is determined to be full (1002) and space is needed to cache other data, a top (earliest in time/nearest expiration) position in a survival queue, such as survival queue 902 of FIGS. 9A and 9B, is checked (1004). If the survival time of the container associated with the top position has expired (1006), "hot" (e.g., recently accessed) blocks comprising the container, if any, are copied forward to a new/different container in the flash cache (1008) and the expired container and any blocks remaining therein are evicted from the flash cache and removed from associated cache management data structures (e.g., queues). If the survival time of the container in the top position of the survival queue has not expired (1006), the container associated with the least recently used (LRU) position of the cold queue, such as cold queue 922, is evicted from the flash cache. Subsequent iterations of the process of FIG. 10 are repeated until no further space is needed in the flash cache (1014).

Figure 11:
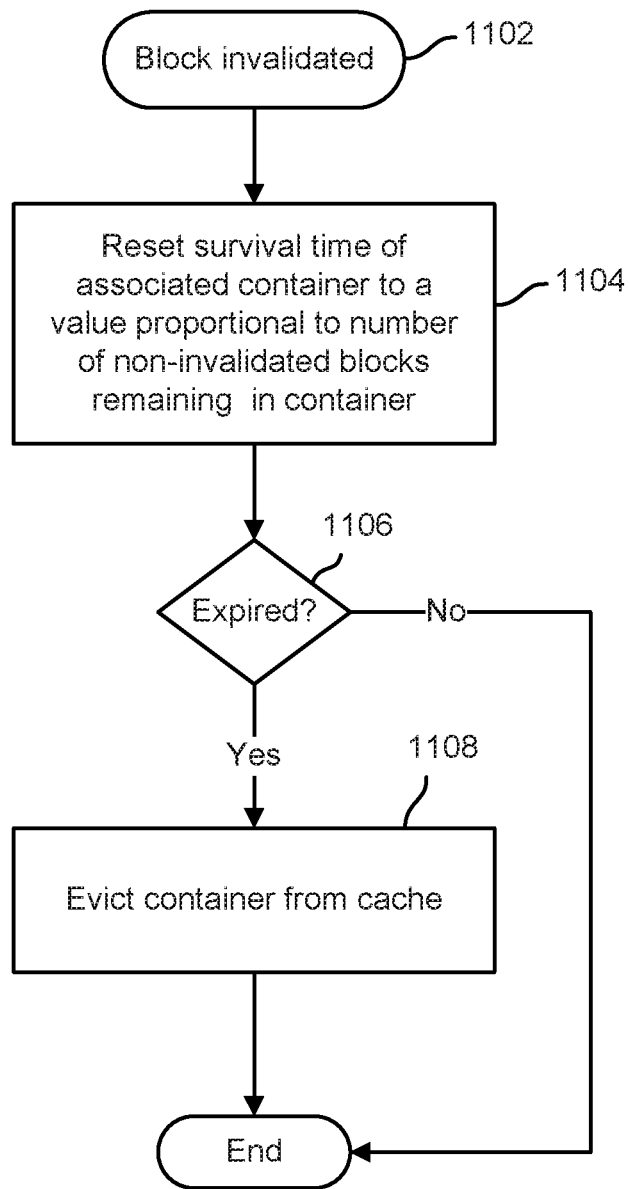
FIG. 11 is a flow chart illustrating an embodiment of a process to update flash cache management data structures upon block invalidation.

FIG. 11 is a flow chart illustrating an embodiment of a process to update flash cache management data structures upon block invalidation. When a block is invalidated (e.g., file is deleted or corresponding portion of file is overwritten) (1102), a survival time of a container with which the block is associated is updated to a value that is proportional to a number of non-invalidated blocks that remain in the container (1104). The updated survival time is compared to the current time, and if the time has expired (1106) the container is evicted immediately from the flash cache (1108). In some embodiments, "hot" blocks that remain valid may be copied forward to another container prior to eviction of a container based on expiration of its survival time.

Figure 12:
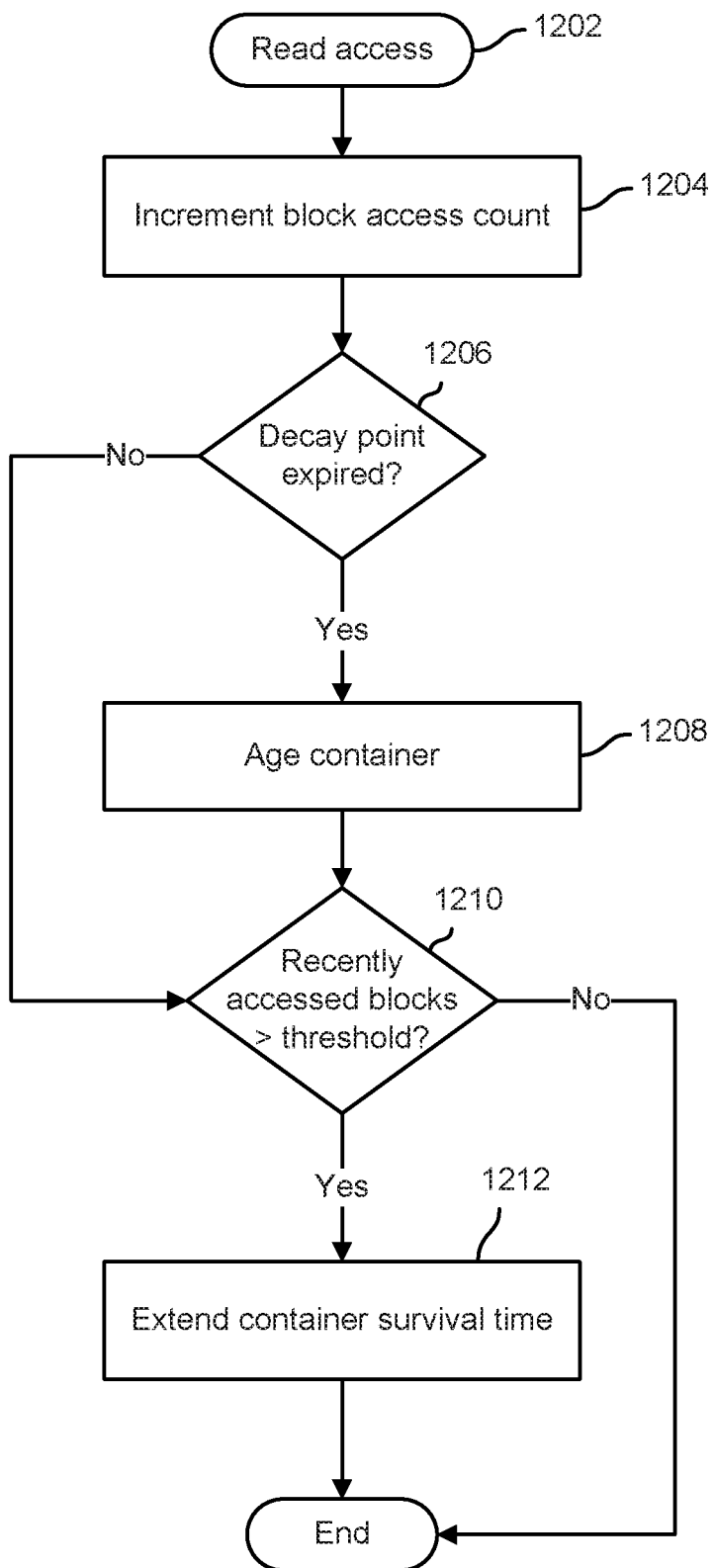
FIG. 12 is a flow chart illustrating an embodiment of a process to update flash cache management data structures.

FIG. 12 is a flow chart illustrating an embodiment of a process to update flash cache management data structures. In the example shown, a "read" access of a block (1202) results in an associated block access count being incremented (1204). A "decay point" is the period until the access counters for a block is decremented. The rationale for decaying block access counts is that accesses in the near past are more likely to indicate the block should remain in a cache as compared to accesses that are further in the past. The decay point associated with a container with which the block is associated is checked. If the decay point has expired, the container is "aged" (1208). For example, aging the container may involve reducing a container frequency or access count by a prescribed amount. In an alternative implementation, the access counts for blocks in the container are reduced. Once the container has been "aged" (1208), or if the decay point of the container has not expired (1206), it is determined whether the number of recently accessed blocks in the container exceeds a prescribed threshold (1210). If so, the survival time of the container (e.g., as stored in a cache information data store, such as array 930 of FIG. 9B) is extended (1212). Otherwise (1210), the process of FIG. 12 ends without the survival time of the container being extended.

Figure 13:
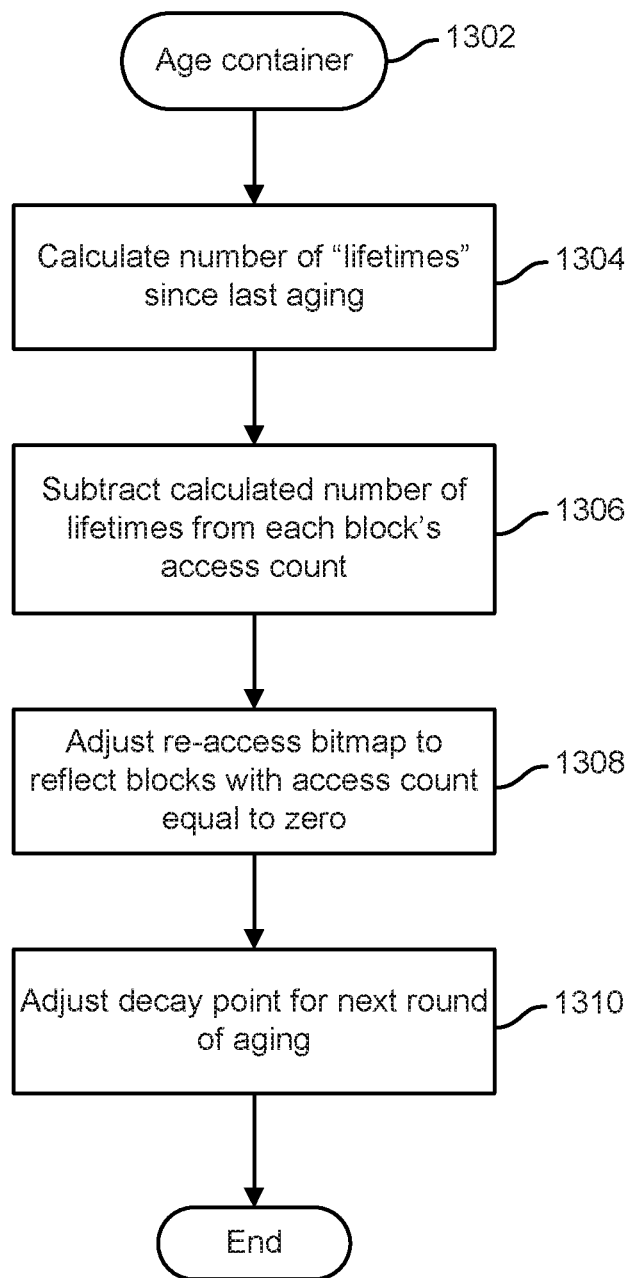
FIG. 13 is a flow chart illustrating an embodiment of a process to "age" a container.

FIG. 13 is a flow chart illustrating an embodiment of a process to "age" a container. In some embodiments, the process of FIG. 13 may be used to implement step 1208 of FIG. 12. In the example shown, an indication to "age" a container is received (1302). A "lifetime" indicates the additional time before a container should be aged. In various embodiments, the "lifetime" may be a prescribed and/or configured value, and/or may be determined by applying statistical technique to access rates sampled from access rate statistics for the system. In some embodiments, a lifetime is determined as the 99th percentile of the reuse distance distribution for sampled blocks, representing a sufficient survival time in the cache. A number of "lifetimes" that have passed, if any, since a last aging of the container is calculated (1304). The calculated number of lifetimes is subtracted from the respective block access count of each block in the container (1306). A re-access bitmap is adjusted to reflect blocks having an access count of zero (1308). The decay point for the container is adjusted for a next round of aging (1310).

In various embodiments, the decay point and/or survival time of a container as set initially to a prescribed and/or computed value. For example, in some embodiments, statistical techniques may be used.

Figure 14:
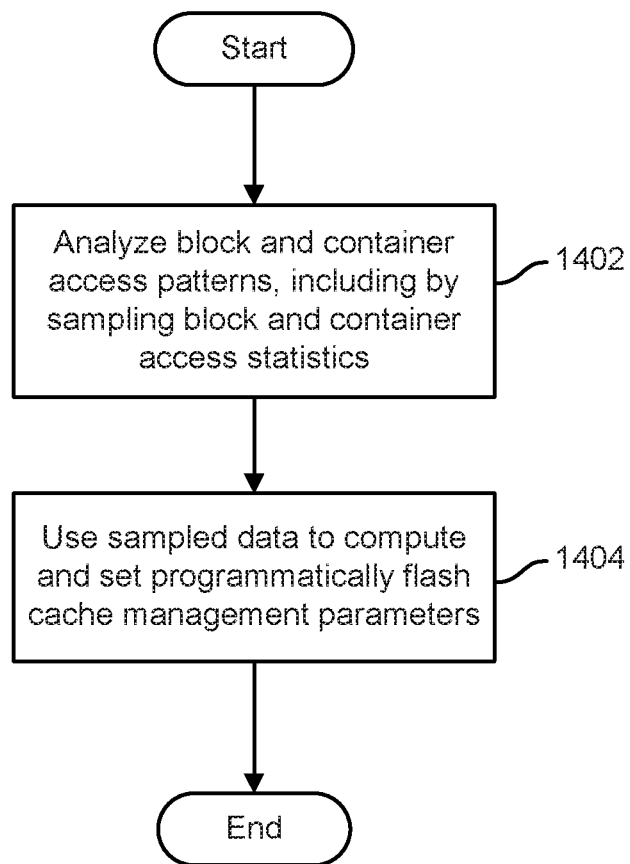
FIG. 14 is a flow chart illustrating an embodiment of a process to determine flash cache management parameters.

FIG. 14 is a flow chart illustrating an embodiment of a process to determine flash cache management parameters. In the example shown, block and container access patterns are analyzed programmatically, including by sampling block and container access statistics (1402). The sampled data is used to compute and set programmatically one or more flash cache management properties (1404). For example, in some embodiments, the "lifetime" parameter described above may be determined as the 99th per-centile of the reuse distance distribution for sampled blocks, representing a sufficient survival time in the cache.

In various embodiments, techniques disclosed herein may be used to manage a container-based flash cache effectively and efficiently. Quicker access may be provided via the flash cache to the data most likely to be required. The efficiency of storing, reading, writing, and managing containers each comprising a plurality of blocks may be realized without excessive flash erasures and without caching longer than otherwise required blocks of data that have been invalidated and/or have not recently been accessed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing stored data, comprising:
associating with each of a plurality of containers stored in a flash cache, each container comprising a plurality of data blocks, a corresponding survival time, wherein:
the corresponding survival time is initially set based at least in part on a statistical computed value;
the corresponding survival time corresponds to a latest time the container is to remain in the flash cache in the absence of satisfaction of a predefined condition that causes the corresponding survival time to be updated; and
the corresponding survival time is updated based at least in part on a calculated proportion of data blocks associated with the container that have been accessed within a preset time threshold; and
selecting a container to evict from the flash cache based at least in part on a determination that the corresponding survival time of the selected container has expired.

2. The method of claim 1, further comprising representing each of the said containers in a corresponding location in a survival queue.

3. The method of claim 2, further comprising sorting the survival queue by survival time and wherein selecting the container to evict comprises reading a topmost location in the survival queue.

4. The method of claim 1, further comprising extending the survival time of a container based at least in part on a determination that a number of blocks in the container that have been accessed within a predefined time period exceeds a prescribed threshold.

5. The method of claim 1, wherein the proportion is calculated relative to a number of blocks in the container that are determined to be no longer valid.

6. The method of claim 1, wherein the survival time is determined based at least in part on a calculated proportion of valid data blocks associated with the container relative to invalidated data blocks in the container.

7. The method of claim 1, further comprising updating the survival time of a container based at least in part on an indication that a data block associated with the container has been invalidated.

8. The method of claim 1, further comprising copying forward from the selected container to a destination container one or more blocks that have been accessed-within a predefined time period.

9. The method of claim 1, further comprising:
incrementing a block access count associated with an access of a block associated with the container;
aging a block access frequency based on a determination that a decay point time has expired; and
extending the survival time of the container based at least in part on a determination that subsequent to said aging a number of blocks comprising the container that have been accessed within a predefined time period exceeds a prescribed threshold.

10. The method of claim 9, wherein said aging is based at least in part on a lifetime parameter determined programmatically based on a statistical analysis of a sample of one or both of block access and container access statistics.

11. The method of claim 10, wherein the statistical analysis uses a Flash Usage Effectiveness (FUE) score.

12. The method of claim 1, wherein the container selected for eviction is selected via an alternative algorithm when no container has passed a corresponding survival time for the container.

13. The method of claim 1, further comprising:
in response to one or more of the plurality of data blocks of at least one of the plurality of containers being deleted from the at least one of the plurality of containers, updating the corresponding survival time.

14. The method of claim 1, further comprising: updating the corresponding survival time of at least one of the plurality of containers based at least in part on an accessing of one or more data blocks associated with the at least one of the plurality of containers.

15. A system, comprising:
a processor configured to:
associate with each of a plurality of containers stored in a flash cache, each container comprising a plurality of data blocks, a corresponding survival time, wherein:
the corresponding survival time is initially set based at least in part on a statistical computed value;
the corresponding survival time corresponds to a latest time the container is to remain in the flash cache in the absence of satisfaction of a predefined condition that causes the corresponding survival time to be updated; and
the corresponding survival time is updated based at least in part on a calculated proportion of data blocks associated with the container that have been accessed within a preset time threshold; and
select a container to evict from the flash cache based at least in part on a determination that the corresponding survival time of the selected container has expired; and
a memory coupled to the processor and configured to store said survival times.

16. The system of claim 15, wherein the processor is further configured to represent each of the said containers in a corresponding location in a survival queue.

17. The system of claim 16, wherein the processor is further configured to sort the survival queue by survival time and wherein selecting the container to evict comprises reading a topmost location in the survival queue.

18. The system of claim 15, wherein the processor is further configured to extend the survival time of a container based at least in part on a determination that a number of blocks in the container that have been accessed within a predefined time period exceeds a prescribed threshold.

19. The system of claim 15, wherein the proportion is calculated relative to a number of blocks in the container that are determined to be no longer valid.

20. The system of claim 15, wherein the survival time is determined based at least in part on a calculated proportion of valid data blocks associated with the container relative to invalidated data blocks in the container.

21. The system of claim 15, wherein the processor is further configured to update the survival time of a container based at least in part on an indication that a data block associated with the container has been invalidated.

22. A computer program product to manage stored data, the computer program product being embodied in a non-transitory computer readable medium and comprising computer instructions for:
associating with each of a plurality of containers stored in a flash cache, each container comprising a plurality of data blocks, a corresponding survival time, wherein:
the corresponding survival time is initially set based at least in part on a statistical computed value;
the corresponding survival time corresponds to a latest time the container is to remain in the flash cache in the absence of satisfaction of a predefined condition that causes the corresponding survival time to be updated; and
the corresponding survival time is updated based at least in part on a calculated proportion of data blocks associated with the container that have been accessed within a preset time threshold; and
selecting a container to evict from the flash cache based at least in part on a determination that the corresponding survival time of the selected container has expired.

* * * * *